US007831678B2

(12) United States Patent
Okamoto

(10) Patent No.: US 7,831,678 B2
(45) Date of Patent: Nov. 9, 2010

(54) ELECTRONIC CONTROL APPARATUS

(75) Inventor: Kazuya Okamoto, Kariya (JP)

(73) Assignee: Denso Corporation, Kariya (JP)

( * ) Notice: Subject to any disclaimer, the term of this patent is extended or adjusted under 35 U.S.C. 154(b) by 455 days.

(21) Appl. No.: 12/056,058

(22) Filed: Mar. 26, 2008

(65) Prior Publication Data

US 2009/0076630 A1    Mar. 19, 2009

(30) Foreign Application Priority Data

Mar. 28, 2007    (JP)    ............... 2007-085046

(51) Int. Cl.
*G06F 15/16*    (2006.01)
(52) U.S. Cl. ............... 709/208; 709/203; 709/216; 709/227
(58) Field of Classification Search ................ 709/203, 709/208, 216, 217
See application file for complete search history.

(56) References Cited

U.S. PATENT DOCUMENTS

| 6,144,887 | A  | 11/2000 | Kamiya et al. |
| 6,249,848 | B1 | 6/2001  | Terada et al. |
| 6,275,911 | B1 | 8/2001  | Terada et al. |
| 6,477,626 | B1 | 11/2002 | Terada et al. |
| 6,493,593 | B1 | 12/2002 | Kamiya et al. |
| 6,505,280 | B2 | 1/2003  | Terada et al. |
| 6,636,989 | B1 | 10/2003 | Kondo et al. |
| 6,876,892 | B2 | 4/2005  | Matsuura et al. |
| 6,957,296 | B2 | 10/2005 | Terada et al. |
| 2001/0049765 | A1 | 12/2001 | Matsuura et al. |
| 2002/0099905 | A1 | 7/2002  | Terada et al. |
| 2003/0041217 | A1 | 2/2003  | Terada et al. |
| 2004/0068548 | A1 | 4/2004  | Sugita |
| 2006/0053235 | A1 | 3/2006  | Terada et al. |
| 2006/0130043 | A1 | 6/2006  | Park et al. |

FOREIGN PATENT DOCUMENTS

| EP | 1 145 912   | 10/2001 |
| JP | 10-111863   | 4/1998  |
| JP | 10-171644   | 6/1998  |
| JP | 10-177504   | 6/1998  |
| JP | 2000-235487 | 8/2000  |

OTHER PUBLICATIONS

Extended European Search Report dated May 8, 2009, issued in corresponding European Application No. 08005786.2-1243.

*Primary Examiner*—Phuoc Nguyen
(74) *Attorney, Agent, or Firm*—Nixon & Vanderhye PC

(57) ABSTRACT

The electronic control apparatus includes at least two microcomputers at least one of which is always supplied with electric power and configured such that, when rewriting of control software of these microcomputers are performed, control software of the microcomputer always supplied with electric power is rewritten after control software of the other microcomputer is rewritten. The electronic control apparatus has a configuration which makes it possible to correctly and reliably rewrite the control software for each of these microcomputers in succession.

8 Claims, 9 Drawing Sheets

ELECTRONIC CONTROL APPARATUS

CROSS-REFERENCE TO RELATED APPLICATION

This application is related to Japanese Patent Application No. 2007-85046 filed on Mar. 28, 2007, the contents of which are hereby incorporated by reference.

BACKGROUND OF THE INVENTION

1. Field of the Invention

The present invention relates to an electronic control apparatus including a plurality of microcomputers, in particular relates to an electronic control apparatus having a function of on-board rewriting the control software of each microcomputer thereof.

2. Description of Related Art

There is known a vehicle-use electronic control apparatus that includes a non-volatile memory such as an EEPROM or flash memory which is electrically rewritable (may be referred to as a rewritable non-volatile memory hereinafter), and is so configured that the control software including control programs and control data stored in the rewritable non-volatile memory thereof can be rewritten even after shipment from the factory.

In such type of the electronic control apparatus, the microcomputer, which operates to control a control object such as a vehicle engine in a normal mode by executing control software stored in a non-volatile memory, shifts from the normal mode to a rewrite mode in which rewrite processing software is executed instead of the control software, if a mode switch command is received from a rewriting device communicatably connected to this electronic control apparatus in order to perform a rewriting process by which the control software in the rewritable non-volatile software is rewritten to different control software transmitted from the rewriting device.

According to such type of the electronic control apparatus, since it is possible to rewrite the control software stored in the rewritable non-volatile memory in a state that the microcomputer is mounted on the electronic control apparatus, that is, since it is possible to perform the onboard-rewriting of the control software, it becomes possible to easily address the situation in which the contents of the operation (the contents of the control) of this electronic control apparatus has to be changed for some reason after it is shipped from the factory.

Recently, there is a trend that such type of the electronic control apparatus includes two or more microcomputers due to the control process becoming complicated. Accordingly, it has been proposed to configure the electronic control apparatus of the type including two or more microcomputers such that the on-board rewriting is possible for each of the microcomputers. For example, refer to Japanese Patents No. 3097580 or No. 3137012.

Some of the electronic control apparatuses of the type including two or more microcomputers are provided with a monitor function that a particular microcomputer monitors the other microcomputer. The particular microcomputer monitors whether the other microcomputer is normally executing the control software in the normal mode, and upon detecting any abnormality, resets the other microcomputer. For more details, refer to the above mentioned patent documents.

The electronic control apparatus of the type including a plurality of microcomputers and being capable of performing the on-board rewriting the control software for each of the microcomputers may be so configured that, when the control software needs to be rewritten, all the microcomputers are caused to shift to the rewrite mode at once, rather than to shift to the rewrite mode successively one by one, by a mode switch command transmitted from the rewriting device, and subsequently the control software is rewritten in succession for each of the microcomputers in this state. That is because, in the case where a plurality of the microcomputers operate sharing the same data, during the period when the control software of one of the microcomputers is being rewritten, it cannot be ensured that the control is performed as desired by the other microcomputers operating in the normal mode.

This configuration is needed particularly in the case where a particular microcomputer Ma is provided with the monitor function of monitoring the other microcomputer Mb. Because, since if the rewriting operation of the control software is performed for the microcomputer Mb in a state in which the microcomputer Ma having the monitor function is kept to be in the normal mode, the microcomputer Ma inevitably resets the microcomputer Mb by the monitor function, it is necessary to cause both the microcomputers Ma, Mb to exit from the normal mode to disable the monitor function of the microcomputer Ma.

However, if the configuration in which all the microcomputers are shifted to the rewrite mode at once is employed in the electronic control apparatus satisfying the following conditions (1) and (2), the rewriting of the control software may not be performed normally.

(1) The electronic control apparatus includes at least two microcomputers A, B, and when the rewriting of the control software is necessary for each of the microcomputers A, B, the rewriting operation is performed on the microcomputer B first.

(2) Of the microcomputers A, B, at least the microcomputer A is always supplied with electric power. The reason for that is explained below.

In the electronic control apparatus as shown in the above mentioned patent documents where each of the microcomputers is configured to be supplied with electric power and to start operation when the ignition switch of a vehicle is turned on, if any one of the microcomputers erroneously has shifted from the normal mode to the rewrite mode, it can be returned to the normal mode by turning off the ignition switch and then turn on the ignition switch again.

On the other hand, in the electronic control apparatus satisfying the above conditions (1), (2), since the microcomputer always supplied with electric power cannot return to the normal mode by turning off and then on the ignition switch, a time-out function is provided at least in the microcomputer A, as a fail-safe measure in case the microcomputer erroneously shifts to the rewrite mode. This time-out function, which is implemented by executing rewrite processing software in the rewrite mode, is a function that the microcomputer is returned to the normal mode if it is detected that information necessary to perform the rewriting (a predetermined command, data constituting control software to be newly written, etc.) has not been transmitted from the rewriting device within a certain time period.

However, the electronic control apparatus satisfying the conditions (1), (2) and provided with the time-out function has the following problem.

When the microcomputers A, B are shifted to the rewrite mode at the same time to perform the rewriting of the control software for the microcomputers A, B in succession, if the rewriting is started for the microcomputer B first, the microcomputer A returns to the normal mode by the action of the time-out function, and accordingly the control software of the microcomputer A cannot be rewritten, because the information necessary to perform the rewriting of the control software is not transmitted from the rewriting device to the microcomputer A during the period in which the control software of the microcomputer B is being rewritten.

In addition, if the microcomputer A is configured to monitor the microcomputer B in the normal mode, the microcomputer A which has returned to the normal mode by the action of the time-out function resets the microcomputer B which is performing the rewriting of the control software. Accordingly, also the control software of the microcomputer B cannot be normally rewritten.

SUMMARY OF THE INVENTION

The present invention provides an electronic control apparatus comprising:

a first microcomputer having a first electrically rewritable non-volatile memory storing first control software; and a second microcomputer having a second electrically rewritable non-volatile memory storing second control software;

of the first and second microcomputers, at least the first microcomputer being always powered by an external power supply device, the first microcomputer controlling a control object by executing the first control software in a normal mode, the second microcomputer controlling a control object by executing the second control software in the normal mode, the first microcomputer being configured to shift to a rewrite mode upon receiving a mode switch command from an external device to execute a first rewrite processing software in order to rewrite the first control software to third control software transmitted from the external device, the second microcomputer being configured to shift to the rewrite mode upon receiving the mode switch command from the external device to execute a second rewrite processing software in order to rewrite the second control software to fourth control software transmitted from the external device, the electronic control apparatus being configured such that the second control software is rewritten first before the first control software is rewritten when the mode switch command is transmitted to both the first and second microcomputers from the external device, the first rewrite processing software including a program causing the first microcomputer to implement a time-out function which makes a determination whether or not information necessary to rewrite the first control software has been transmitted from the external device within a predetermined time from a time of shift of the first microcomputer to the rewrite mode, and causes the first microcomputer to return from the rewrite mode to the normal mode to execute the first control software if result of the decision is negative, wherein, the first microcomputer is configured not to directly shift to the rewrite mode, but shifts to a standby state to wait for shift to the rewrite mode without executing the first control software when the first microcomputer has received the mode switch command, and configured to shift from the standby state to the rewrite mode upon receiving a mode shift permission command from the external device.

According to the present invention, in an electronic control apparatus including at least two microcomputers at least one of which is always supplied with electric power and configured such that, when rewritings of control software of these microcomputers are performed, control software of the microcomputer always supplied with electric power is rewritten after control software of the other microcomputer is rewritten, it becomes possible to correctly and reliably rewrite the control software for each of these microcomputers in succession.

Other advantages and features of the invention will become apparent from the following description including the drawings and claims.

PREFERRED EMBODIMENTS OF THE INVENTION

Figure 1:
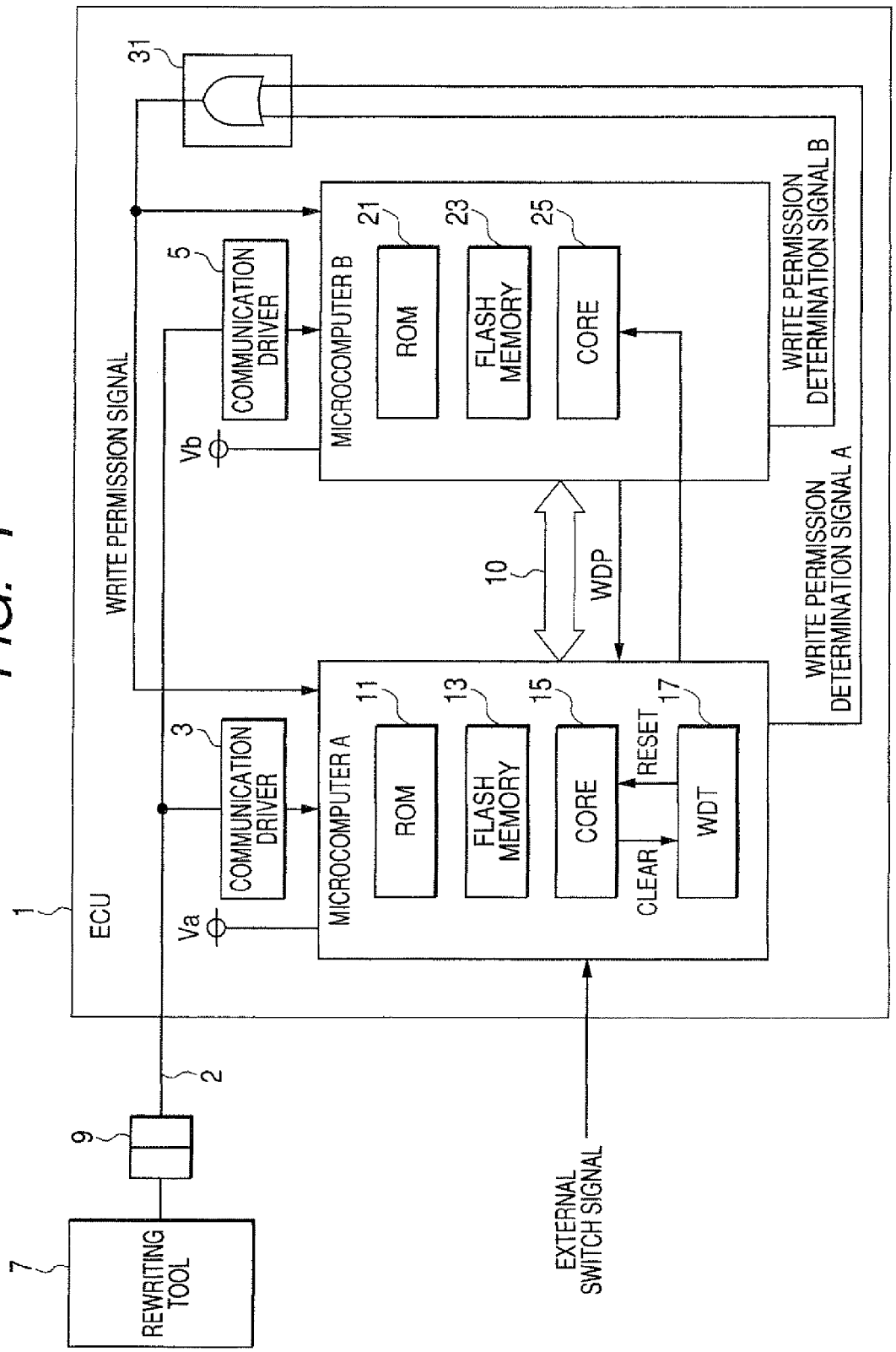
FIG. 1 is a diagram showing a structure of an electronic control apparatus (ECU) of an embodiment of the invention.

FIG. 1 is a diagram showing the structure of an electronic control apparatus (referred to as an ECU hereinafter) 1 of a first embodiment of the invention. The ECU 1, which is mounted on a vehicle, includes a microcomputer A and a microcomputer B.

The microcomputer A is always applied with power supply voltage Va from a not shown power supply device to perform control of power supply for other ECUs mounted on the same vehicle, and control of vehicle mounted devices required to always operate. The microcomputer B is applied with a power supply voltage Vb from a not shown power supply device to perform engine control while an ignition switch of the vehicle is on.

The ECU1 is connected to an in-vehicle communication line 2 laid in the vehicle. The ECU 1 is provided with communication drivers 3, 5 for enabling the microcomputers A, B to perform communication with other devices connected to the in-vehicle communication line 2.

To rewrite software executed by the microcomputers A, B, a rewriting tool 7 as an external device is connected to the in-vehicle communication line 2 through a connector 9, so that the microcomputers A, B can communicate with the rewriting tool 7 through the communication drivers 3, 5. Although not shown in the drawing, the rewriting tool 7 includes a microcomputer as its essential part, and is provided with a communication driver.

Next, the structures of the microcomputers A, B are explained. The microcomputer A includes a non-rewritable RON 11, a flash memory 13 as a rewritable nonvolatile memory, and a core 15 for executing software stored respectively in the ROM 11 and the flash memory 13.

Likewise, the microcomputer B includes a non-rewritable RON 21, a flash memory 23 as a rewritable non-volatile memory, and a core 25 for executing software stored respectively in the ROM 21 and the flash memory 23.

The microcomputer A further includes a WDT (watchdog timer) 17 for monitoring whether or not the core 15 is executing the software normally. The WDT 17 is so configured to reset the core 15 if the timer value of its own is not cleared by the core 15 within a predetermined time Ta.

The flash memory 23 of the microcomputer B stores application software including control software for engine control. The microcomputer B controls the engine by executing the control software stored in the flash memory 23 by means of the core 25, while performing communication with the microcomputer A through an internal communication line 10 at intervals of a predetermined time Tb1. The microcomputer B also outputs a watchdog pulse WDP to the microcomputer A at intervals of a predetermined time Tb2.

Figure 2:
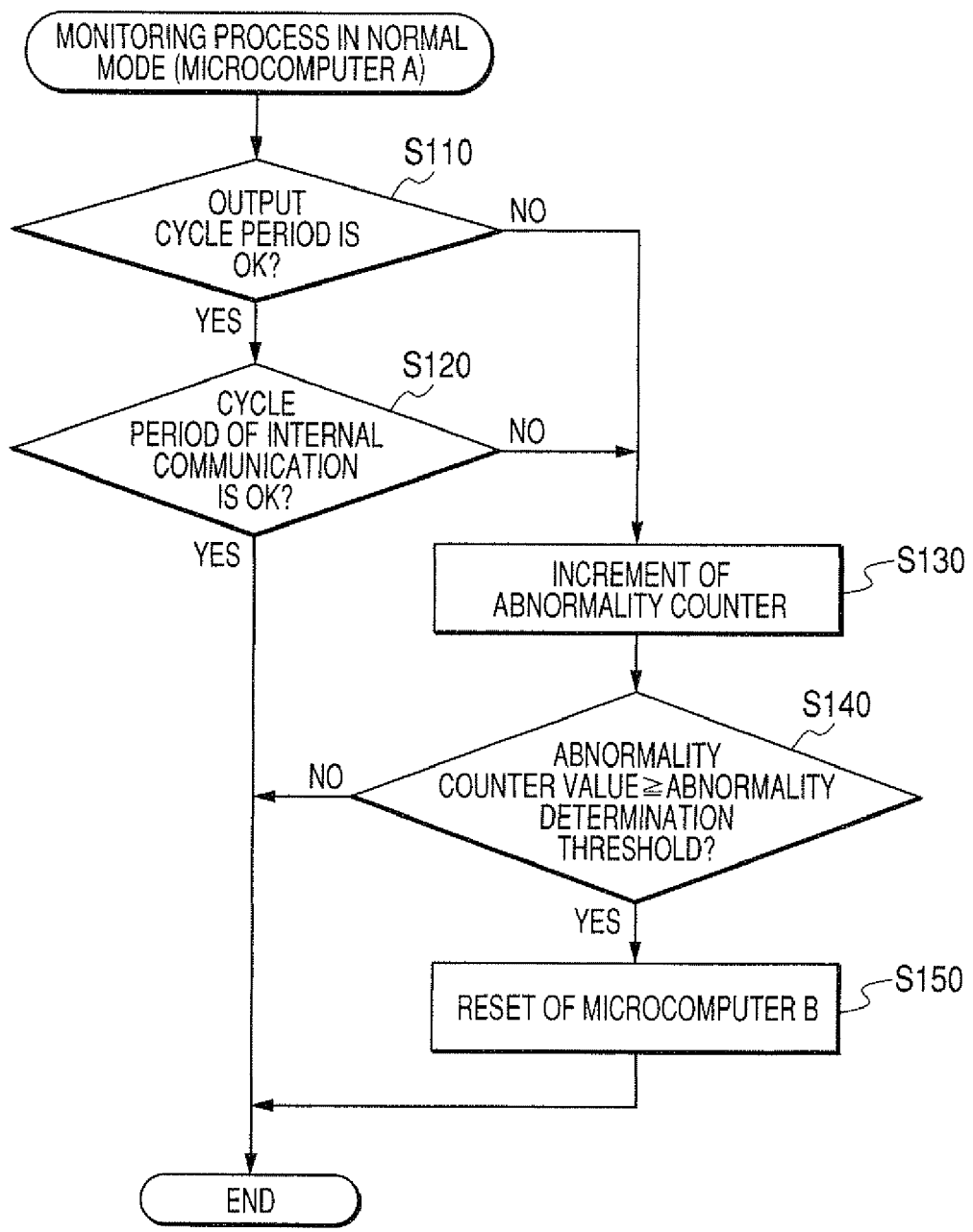
FIG. 2 is a flowchart showing the steps of a monitoring process performed by a microcomputer A in a normal state included in the ECU.

The flash memory 13 of the microcomputer A stores application software including the control software for performing control of power supply for the other ECUs, and control of the vehicle mounted devices required to always operate. The microcomputer A controls power supply for the other ECUs, and controls the vehicle-mounted devices by executing the control software stored in the flash memory 13 by means of the core 15 while performing communication with the microcomputer B through the internal communication line 10. The microcomputer A also clears the WDT 17 at intervals of the predetermined time Ta. As explained above, the microcomputer A is monitored by the WDT 17 included therein, and the microcomputer B is monitored by the microcomputer A. Accordingly, the control software executed by the microcomputer A includes a program for performing a monitoring process shown in FIG. 2.

The contents of the monitoring process is explained below. This monitoring process begins by determining at step S110 whether or not the output cycle period of the watchdog pulse WDP received from the microcomputer B is within the predetermined time Tb2. If this determination result is affirmative, it is determined at step S120 whether or not signal is being received from the microcomputer B at intervals within the predetermined time Tb1 through the internal communication line 10, that is, whether the internal communication cycle period is in order or not. If this determination result is affirmative, this monitoring process is terminated.

If the determination result at step S110 is negative, or the determination result at step S120 is negative, the process proceeds to step S130 where an abnormality counter is incremented. At subsequent step S140, it is determined whether or not the count value of the abnormality counter exceeds an abnormality determination threshold value. If this determination result is negative, the monitoring process is terminated.

On the other hand, if this determination result is affirmative, since it means that the control software is not being executed normally by the microcomputer B, the process proceeds to step S150 to output a reset signal to reset the core 25 of the microcomputer B. After this, the monitoring process is terminated.

In the ROM 21 of the microcomputer B, there is stored rewrite processing software for rewriting the software stored in the flash memory 23 to new software transmitted from the rewriting tool 7. Likewise, in the ROM 111 of the microcomputer A, there is stored a rewrite processing software for rewriting the software stored in the flash memory 13 to new software transmitted from the rewriting tool 7.

As shown in FIG. 1, the ECU 1 includes an OR circuit 31 which outputs, as a write-permission signal, a logical sum of a write-permission determination signal outputted from the microcomputer A at a later-described timing, and a write-permission determination signal outputted from the microcomputer B at a later-described timing. This write-permission signal is inputted into the microcomputers A, B.

The microcomputer A is inputted with an ignition switch signal which is set at the active level when the ignition switch is on, as one of external switch signals.

Next, the process performed by the rewriting tool 7, and the operations of the microcomputers A, B of the ECU 1 are explained with reference to the flowcharts shown in FIGS. 3 to 8. In the following explanation, each of signals, events. etc. related to the microcomputer A is given a name with the suffix "A", such as, for example, signal A, communication A, software A, and command A. Likewise, each of signals, events, etc. related to the microcomputer B is given a name with the suffix "B", such as, for example, signal B, communication B, software B, and command B.

First, the rewriting process performed by the rewriting tool 7 (by the microcomputer included in the rewriting tool 7 to be exact) is explained with reference to the flowchart shown in FIG. 3. The rewriting tool 7 starts the rewriting process when an operator performs a predetermined manipulation after the rewriting tool 7 is connected to the in-vehicle communication line 2.

The rewriting process begins by performing a security communication A with the microcomputer A at step S200, and then performing a security communication B with the microcomputer B at subsequent step S210. The purpose of the security communications A, B is to exchange specific information with the microcomputers A, B in order to unlock the security locks in the microcomputers A, B. The microcomputers A, B enter the state to accept mode switch commands A, B from the rewriting tool 7 when their locks are unlocked. The purpose of the mode switch commands A, B is to switch the operation mode of the microcomputers A, B from the normal mode to perform the control software to the rewrite mode to execute the rewrite processing software.

After that, the rewriting tool 7 performs a rewrite mode shifting communication A with the microcomputer A at step S220, and then performs a rewrite mode shifting communication B with the microcomputer B at step S230. The purpose of the rewrite mode shifting communications A, B is to cause the microcomputers A, B to shift to the rewrite mode by transmitting the mode switch commands A, B, and then exchanging specific information with the microcomputers A, B.

Subsequently, the rewriting tool 7 performs an initial communication B with the microcomputer B at step S240, and then performs a data communication B with the microcomputer B at step S250. The purpose of the initial communication B is to cause the microcomputer B that has shifted to the rewrite mode to prepare for the rewriting of the software stored in the flash memory 23. For example, an area to be rewritten in the flash memory 23 is designated by this initial communication B. The purpose of the data communication B is to transmit new control software B in serial blocks of a predetermined data size, and to cause the microcomputer B to rewrite the existing control software B in the flash memory 23 to this new control software B.

When the data communication B at step S250 is completed (that is, when the rewriting of the control software in the microcomputer B is completed), the rewriting tool 7 transmits a rewrite object switch command to the microcomputer A. At this time, the microcomputer A actually shifts to the rewrite mode as explained later. The purpose of the rewrite object switch command is to indicate that an object to undergo the software rewriting is switched from any microcomputer other than the microcomputer A to the microcomputer A.

Subsequently, the rewriting tool 7 performs an initial communication A with the microcomputer A at step S270, and then performs a data communication A with the microcomputer A at step S280. The purpose of the initial communication A is to cause the microcomputer A that has shifted to the rewrite mode to prepare for the rewriting of the software stored in the flash memory 13. For example, an area to be rewritten in the flash memory 13 is designated by this initial communication A. The purpose of the data communication A is to transmit new control software A in serial blocks of a predetermined data size, and to cause the microcomputer A to rewrite the existing control software A in the flash memory 13 to this new control software A.

When the data communication A at step S280 is completed (that is, when the rewriting of the control software in the microcomputer A is completed), the rewriting tool 7 transmits a completion notification command to the microcomputers A, B, and then the rewriting process is terminated. The completion notification command is a command indicating that the software rewriting has been completed.

Next, the operation of the microcomputer B is explained with reference to the flowchart shown in FIG. 4. In this operation, step 300 is implemented by the control software B stored in the flash memory 23, steps S3310 to S370 are implemented by application software B other than the control software B, and steps S380, S390 are implemented by the rewrite processing software B stored in the ROM 21.

Figure 4:
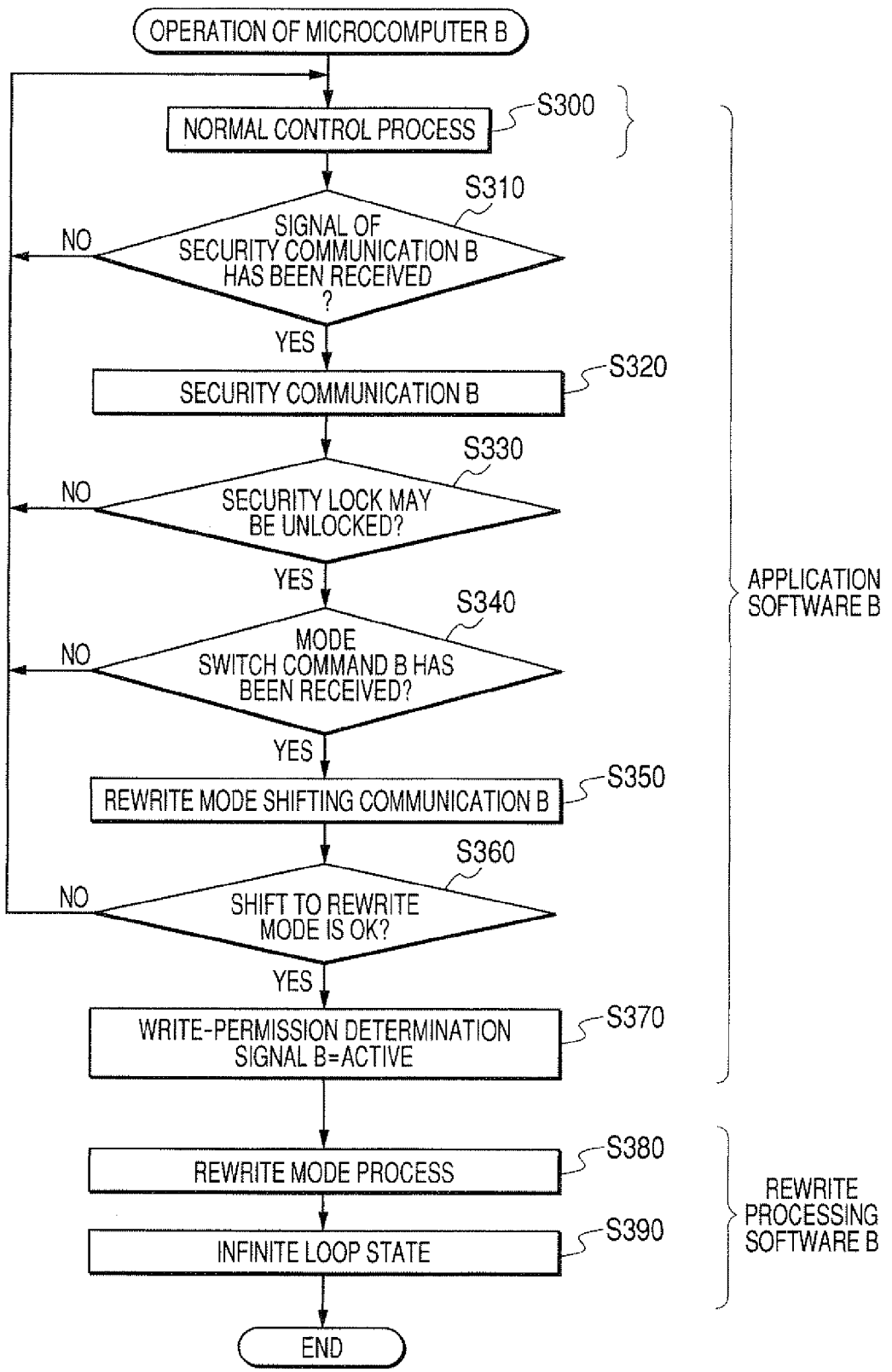
FIG. 4 is a flowchart showing the steps of an operation of a microcomputer B in a normal state included in the ECU.

As shown in FIG. 4, when the microcomputer B starts operation from the initial state, it performs normal control process by executing the control software B stored in the flash memory 23 at step S300. In this embodiment, as described in the foregoing, the microcomputer B controls the engine by executing the control software B, while performing communication with the microcomputer A through the internal communication line 10 at intervals of the predetermined time Tb1, and also outputs the watchdog pulse WDP to the microcomputer A at intervals of the predetermined time Tb2.

While performing this control process, the microcomputer B determines at step S310 whether or not the signal of the security communication B has been received from the rewriting tool 7. Until this determination result becomes affirmative, the microcomputer B continues to be in the normal mode to perform the control process.

If the determination result at step S310 becomes affirmative, the operation proceeds to step S320 where the microcomputer B continues to perform the security communication B with the rewriting tool 7. Thereafter, the process proceeds to step S330 to determine whether or not the security lock may be unlocked. In this embodiment, if the security communication B with the rewriting tool 7 has been completed normally, it is determined that the security lock may be unlocked (S310: NO→S300).

If the determination result at step S330 is negative, the operation returns to step S300 to perform the control process in accordance with the control software B. If the determination result at step S330 is affirmative, the operation proceeds to step S340.

At step S340, it is determined whether or not the mode switch command B has been received from the rewriting tool 7 within a predetermined time from the time when it has been determined that the security lock may be unlocked at step S330. If this determination result is negative, the operation returns to step S300 to perform again the control process in accordance with the control software B. If this determination result is affirmative, the operation proceeds to step S350 to perform the rewrite mode shifting communication B with the rewriting tool 7.

Thereafter, it is determined at step S360 whether or not the microcomputer B may shift to the rewrite mode. In this embodiment, if the rewrite mode shifting communication B with the rewriting tool 7 has been completed normally, it is determined that the microcomputer B may shift to the rewrite mode. If this determination result is negative, the operation returns to step S300 to perform again the control process in accordance with the control software B. If this determination result is affirmative, the operation proceeds to step S370.

At step S370, the write-permission determination signal B is set to the active level (high level in this embodiment) to indicate that data writing to the flash memory 23 is permitted, and then the program execution address jumps into the rewrite processing software B in the ROM 21.

As a consequence, the microcomputer B shifts to the rewrite mode, and performs a rewrite mode process B by executing the rewrite processing software B at step S380.

Figure 5:
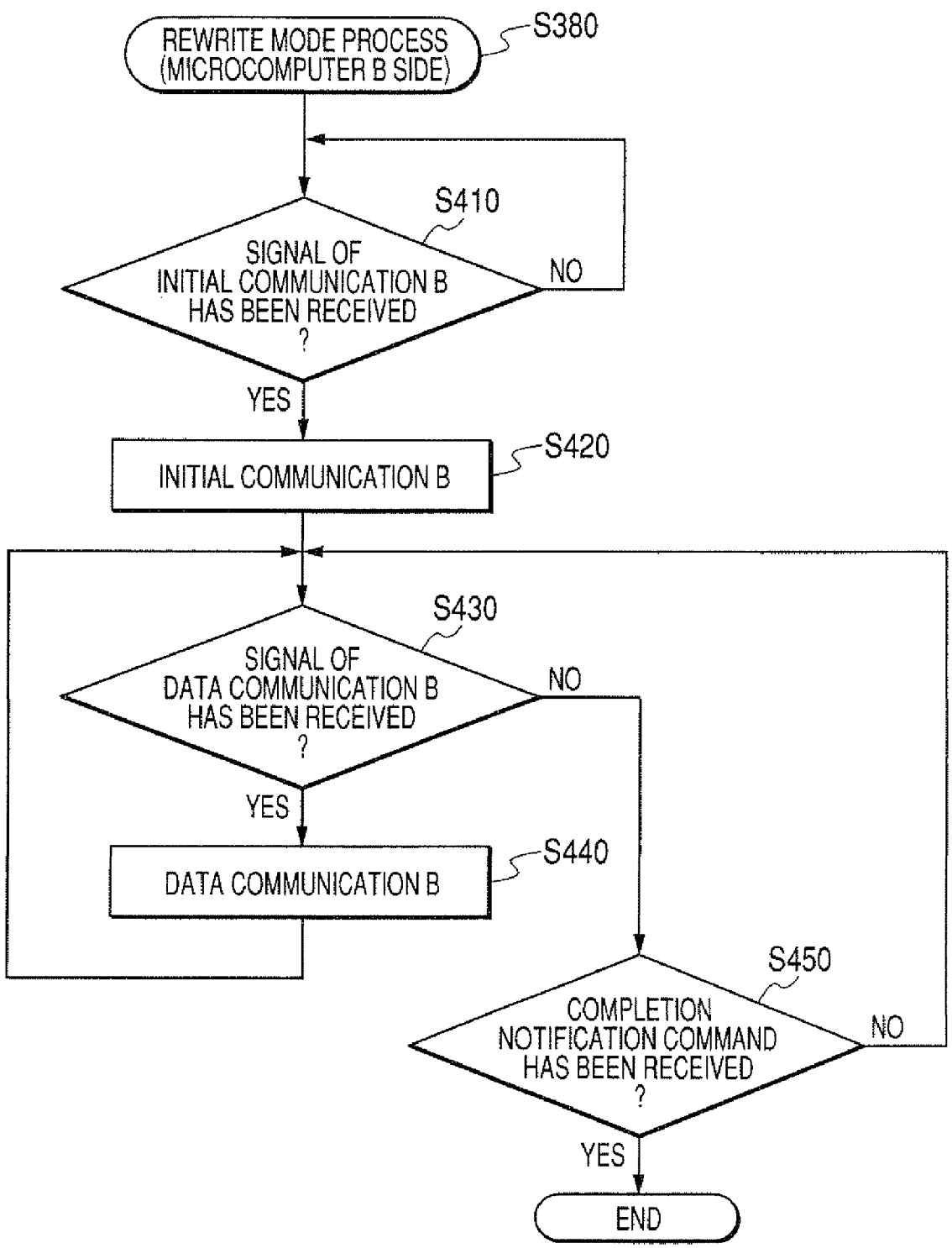
FIG. 5 is a flowchart showing the steps of a rewrite mode process included in the operation shown in FIG. 4.

As shown in FIG. 5, the rewrite mode process in accordance with the rewrite processing software B begins by determining whether or not the signal of the initial communication B has been received from the rewriting tool 7 at step S410. If this determination result is affirmative, the process proceeds to step S420 to continue to perform the initial communication B with the rewriting tool 7.

When the initial communication B has been completed, it is determined at step S430 whether or not the signal of the data communication B (that is, one of the serial blocks constituting the new control software B transmitted from the rewriting tool 7) has been received. If this determination result is affirmative, the process proceeds to step S440. At step S440, there is performed the rewriting process in which one of the blocks received this time, which constitutes the new control software B, is written into the flash memory 23 as updating data. After completion of step S440, the process returns to step S430.

If the determination result at step S430 is negative, the process proceeds to step S450 to determine whether or not the completion notification command has been received from the rewriting tool 7. If this determination result is negative, the process returns to step S430 again.

In the determination result at step S450 is affirmative, the rewrite mode process is terminated, and the operation proceeds to step S390 shown in FIG. 4. In this case, the microcomputer B enters an infinite loop state where the microcomputer B does not perform any substantial process.

Next, the operation of the microcomputer A is explained with reference to the flowchart shown in FIG. 6. In this operation, step 500 is implemented by the control software A stored in the flash memory 13, steps S510 to S575 are implemented by application software A other than the control software A stored in the flash memory 13, and steps S580, S590 are implemented by the rewrite processing software A stored in the ROM 11.

Figure 6:
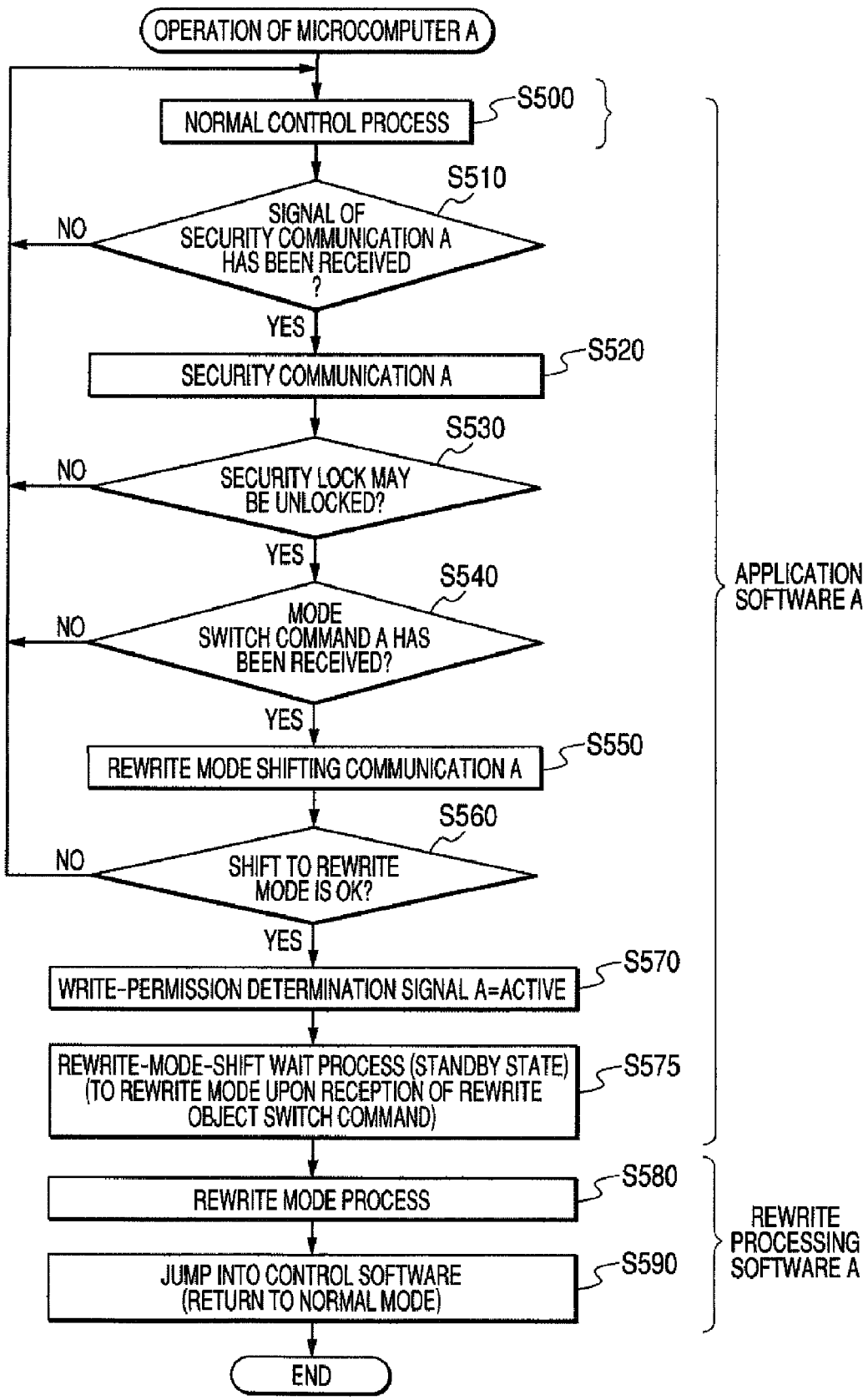
FIG. 6 is a flowchart showing the steps of an operation of a microcomputer B included in the ECU.

As shown in FIG. 6, when the microcomputer A starts operation from the initial state, it performs normal control process by executing the control software A stored in the flash memory 13 at step S500. More specifically, as described in the foregoing, the microcomputer A operates to control the power supply for the other ECUs and control the vehicle-mounted devices by executing the control software A, while performing communication with the microcomputer B through the internal communication line 10. The microcomputer A also clears the WDT 17 at intervals of the predetermined time Ta, and performs the monitoring process shown in FIG. 2 to monitor the operation of the microcomputer B.

While performing this control process, the microcomputer A determines at step S510 whether or not the signal of the security communication A is received from the rewriting tool 7. Until this determination result becomes affirmative, the microcomputer A continues to be in the normal mode to perform the control process.

If the determination result at step S510 becomes affirmative, the operation proceeds to step S520 where the microcomputer A continues to perform the security communication A with the rewriting tool 7. Thereafter, the operation proceeds to step S530 to determine whether or not the security lock may be unlocked. In this embodiment, if the security communication A with the rewriting tool 7 has been completed normally, it is determined that the security lock may be unlocked (S510: No→S500).

If the determination result at step S530 is negative, the operation returns to step S500 to perform the control process in accordance with the control software A. If the determination result at step S530 is affirmative, the operation proceeds to step S540.

At step S540, it is determined whether or not the mode switch command A has been received from the rewriting tool 7 within a predetermined time from the time when it has been determined that the security lock may be unlocked at step S530. If this determination result is negative, the operation returns to step S500 to perform again the control process in accordance with the control software A. If this determination result is affirmative, the operation proceeds to step S550 to perform the rewrite mode shifting communication A with the rewriting tool 7.

Thereafter, it is determined at step S560 whether or not the microcomputer A may shift to the rewrite mode. In this embodiment, if the rewrite mode shifting communication A with the rewriting tool 7 has been completed normally, it is determined that the microcomputer A may shift to the rewrite mode. If this determination result is negative, the operation returns to step S500 to perform again the control process in accordance with the control software A. If this determination result is affirmative, the operation proceeds to step S570.

Figure 7:
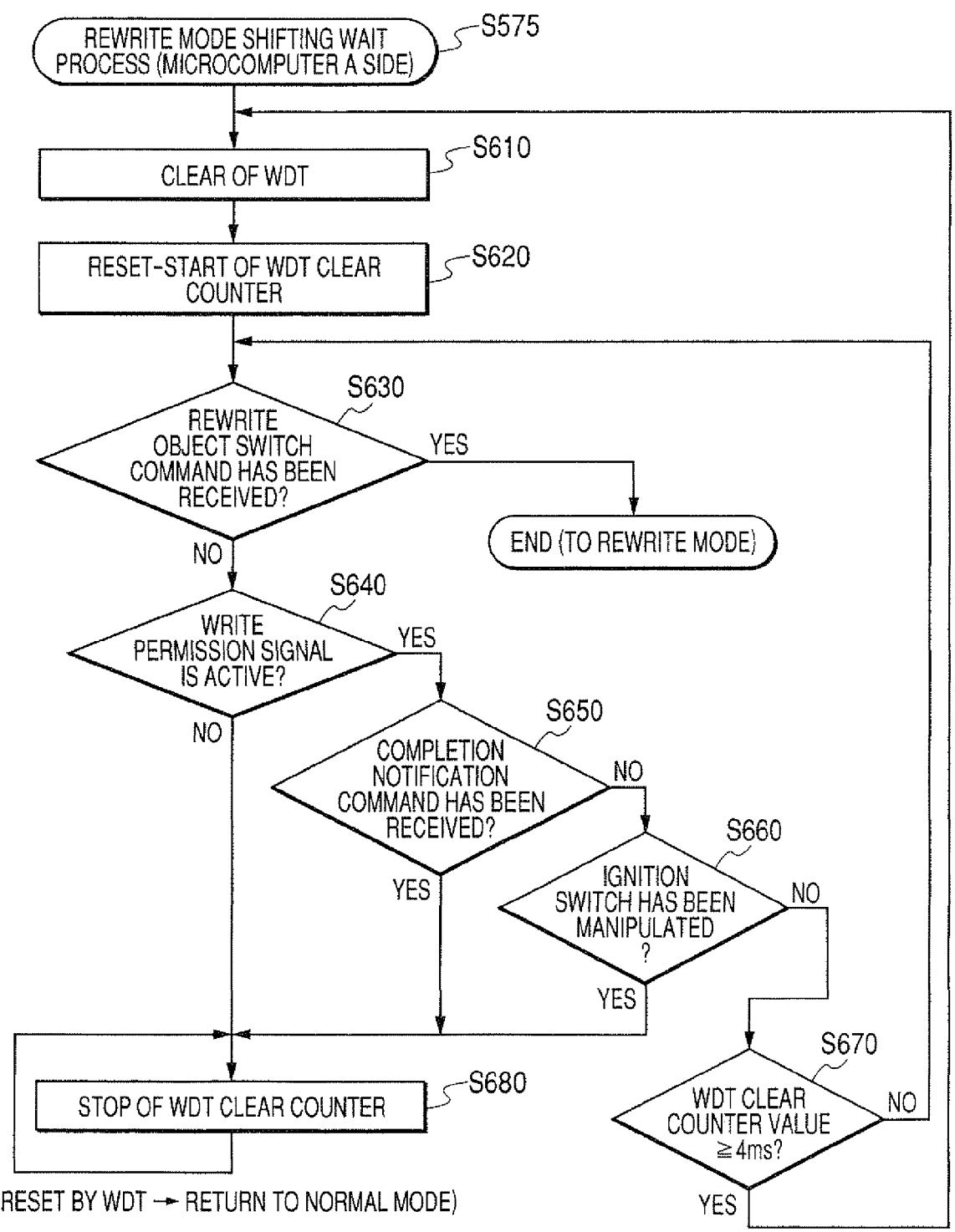
FIG. 7 is a flowchart showing the steps of a rewrite-mode-shift wait process included in the operation shown in FIG. 6.

At step S570, the write-permission determination signal B is set to the active level (high level in this embodiment) to indicate that data writing to the flash memory 13 is permitted, and then the operation proceeds to step S575 to perform a write-mode-shift wait process shown in FIG. 7.

As shown in FIG. 7, the write-mode-shift wait process begins by clearing the WDT 17 at step S610, and then reset-starting a WDT clear counter at step S620. This WDT clear counter, which is a timer counter for measuring a period at which the WDT 17 is cleared, is incremented at regular time intervals by a not shown timer process, or by hardware.

At subsequent step S630, it is determined whether or not the rewrite object switch command has been received from the rewriting tool 7. If this determination result is negative, the process proceeds to step S640.

At step S640, it is determined whether or not the write permission signal received from the OR circuit 31 is at the active (high) level. If this determination result is affirmative, it is determined at step S650 whether the completion notification command has been received from the rewriting tool 7. If this determination result is negative, it is determined at step S660 whether or not the ignition switch has been turned off from on the basis of the ignition switch signal. If this determination result is negative, the process proceeds to step S670.

At step S670, it is determined whether or not the count value of the WDT clear counter has reached a value corresponding to a predetermined time period (4 ms in this embodiment) shorter than the predetermined time Ta which is the timeout period of the WDT 17. If this determination result is negative, the process returns to step S630. If this determination result is affirmative, the process returns to step S610.

If the determination result at step S640 is negative, or the determination result at step S650 is affirmative, or the determination result at step S660 is affirmative, the process proceeds to step S680 to stop the increment of the WDT clear counter, and loops in this state.

As a consequence, since step S610 to clear the WDT 17 is not performed thereafter, when the predetermined time Ta has elapsed, the microcomputer A is reset by the WDT 17, and accordingly returns to the normal mode to execute the control software A.

On the other hand, if the determination result at step S630 is affirmative, this write-mode-shift wait process is terminated, and then the program execution address jumps into the rewrite processing software A in the ROM 11. As a consequence, the microcomputer A shifts to the rewrite mode, and performs the rewrite mode process (step S580) by executing the rewrite processing software A.

That is, while the microcomputer A performs the write-mode-shift wait process, the microcomputer A is actually in a standby state in which it does not perform the control software A. In this standby state, if neither of the rewrite object switch command and the completion notification command is received, the write permission signal from the OR circuit 31 is at the active level, and the ignition switch is not turned off, step S610 and step S620 are performed every 4 ms, and accordingly the WDT 17 is cleared every 4 ms. This is for preventing the microcomputer A from being reset by the WDT 17. Incidentally, when the microcomputer A enters this standby state through the normal processes described above, the write permission signal from the OR circuit 31 is definitely at the active level at least by the process at step S570 shown in FIG. 6.

In case the write permission signal from the OR circuit 31 is not at the active level (S640: NO) when the microcomputer A has entered the standby state, or in case the completion notification signal is received from the rewriting tool 7 (S650: YES) or the ignition switch is turned off (S660: YES) while the microcomputer A is in the standby state, the microcomputer A is reset by the WDT 17, and returns to the normal mode.

On the other hand, if the rewrite object switch command is received from the rewriting tool 7 while the microcomputer A is in the standby state (S630: YES), the microcomputer A exits from the standby state and shifts to the rewrite mode to perform the rewrite processing software A.

Figure 8:
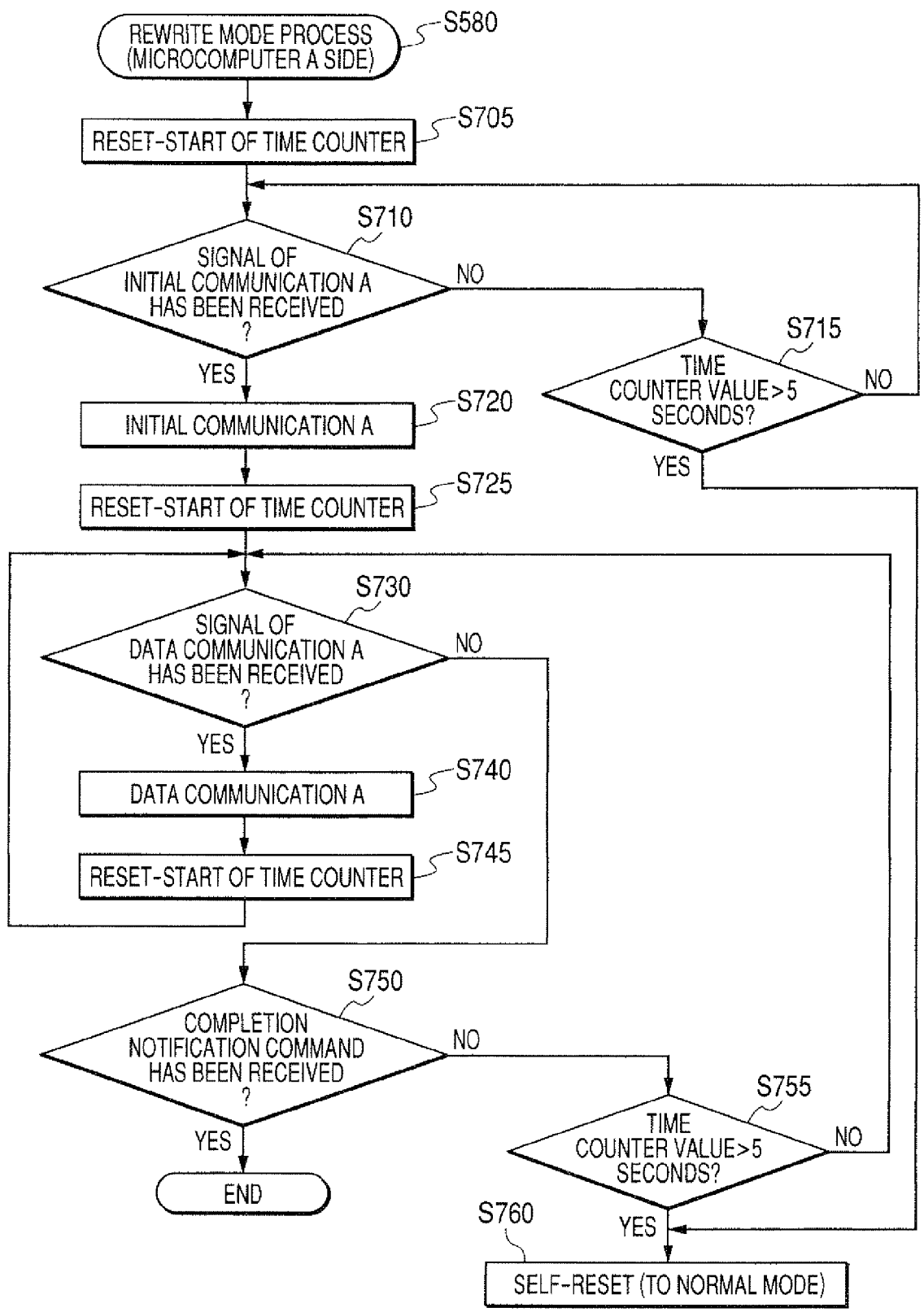
FIG. 8 is a flowchart showing the steps of a rewrite mode process included in the operation shown in FIG. 6.

As shown in FIG. 8, the rewrite mode process in accordance with the rewrite processing software A begins by reset-starting a time counter at step S705. This time counter, which is a timer counter having a time-out function, is incremented at regular time intervals by a not shown timer process, or by hardware.

Subsequently, at step S710, it is determined whether or not the signal of the initial communication A has been received from the rewriting tool 7. If this determination result is negative, the process proceeds to step S715. At step S715, it is determined whether or not the count value of the time counter has exceeded a time-out period (5 seconds in this embodiment). If this determination result is negative the process returns to step S710.

If the determination result at step S710 is affirmative, the process proceed to step S720 to continue the initial communication A with the rewriting tool 7. After completion of the initial communication A, the time counter is caused to make a reset start again at step S725.

After that, it is determined whether or not the signal of the data communication A (that is, one of the blocks constituting the new control software A transmitted from the rewriting tool) is being received. If this determination result is affirmative, the process proceeds to step S740 where there is performed the rewrite process in which one of the blocks received this timer which constitutes the new control software A, is written into the flash memory 13 as updating data. Subsequently, the time counter is caused to make a reset-start at step S745, and then the process returns to step S730.

At this time, if the determination result at step S730 is negative, the process proceeds to step S750 to determine whether or not the completion notification command has been received from the rewriting tool 7. If this determination result is negative, the process proceeds to step S755. At step S755, it is determined whether or not the count value of the time counter has exceeded the value corresponding to the time-out period of 5 seconds. If this determination result is negative, the process returns to step S730.

If the determination result at step S750 is affirmative, since it means that the rewritings of the control software in the ECU 1 have been all completed, the rewrite mode process is terminated, and the operation proceeds to step S590 shown in FIG. 6. At step S590, the program execution address jumps to the start address of the control software A. As a consequence, the microcomputer A returns to the normal mode.

On the other hand, also if it is determined that the count value of the time counter has exceeded the value corresponding to the period of 5 seconds at either one of step S715 and step S755, the program execution address jumps to the start address of the control software A. Accordingly, in this case, the microcomputer A returns to the normal mode even if the rewriting of the control software A is not completed.

The microcomputer B which operates on the power supply voltage Vb can be caused to return to the normal mode by turning off and then on the ignition switch, when it has erroneously shifted to the rewrite mode. On the other hand, since the microcomputer A operates on the power supply voltage Va always supplied, the time-out function by steps S705, S715, S725, S745, S755, S760 are prepared as a fail-safe function for the case where the microcomputer A erroneously shifts to the rewrite mode. More specifically, this embodiment is configured such that the microcomputer A returns to the normal mode, if the signal of the initial communication A is not received from the rewriting tool 7 over the period of 5 seconds, or the completion notification command is not received from the rewriting tool 7 over the period of 5 seconds in a state that the signal of the data communication A is not being received.

Although not shown in the drawing, the microcomputer A performs a process to clear the WDT 17 every predetermined time Ta (every 4 ms, for example) so as not to be reset by the WDT 17.

Figure 9:
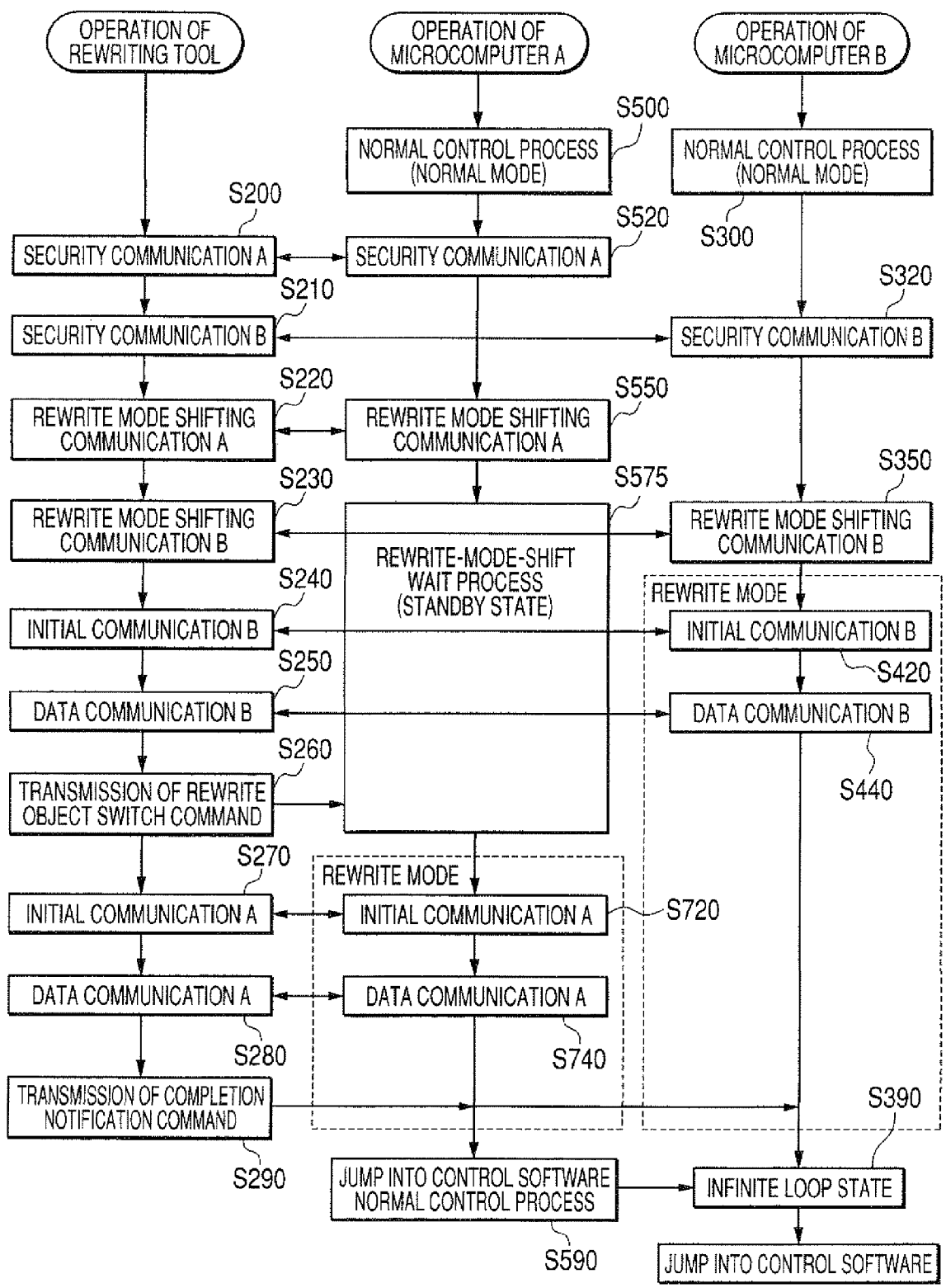
FIG. 9 is a diagram showing the flow of operations of the rewriting tool, and the microcomputers A, B.

As shown in FIG. 9, to rewrite the control software for each of the microcomputers A, B included in the ECU1 having the above described structure, the rewriting tool 7 performs the security communications A, B with the microcomputers A, B in order to unlock the security locks in the microcomputers A, B.

After that, the rewriting tool 7 transmits the mode switch commands A, B to the microcomputers A, B to perform the rewrite mode shifting communications A, B with the microcomputers A, B. As a consequence, the microcomputer B, which should rewrite the control software before the microcomputer A, shifts from the normal mode to the rewrite mode. On the other hand, the microcomputer A, which should rewrite the control software after the microcomputer B, exits from the normal mode and enters the standby state to perform the write-mode-shift wait process shown in FIG. 7.

Thereafter, through the initial communication B and the data communication B between the rewriting tool 7 and the microcomputer B, the new control software B is transmitted from the rewriting tool 7 to the microcomputer B. The microcomputer B rewrites the control software B in the flash memory 23 to this new control software B.

After completion of the rewriting of the control software B, the rewriting tool 7 transmits the rewrite object switch command (mode shift permission command) to the microcomputer A. In response to this rewrite object switch command, the microcomputer A shifts to the rewrite mode.

Thereafter, through the initial communication A and the data communication A between the rewriting tool 7 and the microcomputer A, the new control software A is transmitted from the rewriting tool 7 to the microcomputer A. The microcomputer A rewrites the control software A in the flash memory 13 to this new control software A.

After completion of the rewriting of the control software A, the rewriting tool 7 transmits the completion notification command to the microcomputers A, B. As a consequence, the microcomputer A terminates the rewrite mode process shown in FIG. 8, and returns to the normal mode to execute the new control software A. On the other hand, although the microcomputer B terminates the rewrite mode process shown in FIG. 5, it does not execute the new control software B, but enters the infinite loop state.

Accordingly, the microcomputer B is reset by the monitor function in accordance with the monitoring process performed by the microcomputer A that has been returned to the normal mode. The microcomputer B thus reset by the microcomputer A returns to the normal mode to execute the new control software B. From this time on, the microcomputers A, B start to perform their primary roles.

Incidentally, although the rewriting tool 7 is configured to transmit the completion notification signal to both the microcomputer A and the microcomputer B in this embodiment, rewriting tool 7 may be configured to transmit the completion notification signal to only the microcomputer A. That is because, if the microcomputer B does not receive the completion notification command after completion of the rewriting of the control software B in the rewrite mode process shown in FIG. 5, since the microcomputer B enters the infinite loop state (S430: NO→S450: NO→S430), and accordingly the microcomputer B is reset by the monitor function of the microcomputer A that has returned to the normal mode, it eventually returns to the normal mode.

In this embodiment, since both the microcomputer A and the microcomputer B are caused to leave the normal state, it is possible that the microcomputer A does not reset the microcomputer B by the monitor function in the normal mode (the function by the monitoring process shown in FIG. 2) while the rewriting of the control software B of the microcomputer B is performed.

Although the microcomputer A leaves the normal mode while the rewriting of the control software B of the microcomputer B is performed, it does not shift to the rewrite mode but enters the standby mode to perform the write-mode-shift wait process shown in FIG. 7. Accordingly, the microcomputer A can be prevented from returning to the normal mode by the time-out function in the rewrite mode (the function by steps S705, S715, S725, S745, S755, S760 shown in FIG. 8). Therefore, the control software A of the microcomputer A can be rewritten without fail after the control software B of the microcomputer B is rewritten.

Hence, it is possible that the microcomputer A monitors the microcomputer B in the normal mode, and the control software B of the microcomputer B and the control software A of the microcomputer A are successively rewritten in this order.

The ECU 1 of this embodiment is configured such that the microcomputer B enters the infinite loop state after completion of the rewriting of the control software B, and the microcomputer A returns to the normal mode after completion of the rewriting of the control software A, and resets the microcomputer B to cause the microcomputer B to return to the normal mode by the monitor function in the normal mode. Accordingly, since the microcomputers A, B can be automatically returned to the normal mode at substantially the same time, it is easy to synchronize the times at which the microcomputers A, B start their controls.

Since the microcomputer A shifts from the standby state to the rewrite mode upon receiving the rewrite object switch command from the rewriting tool 7, it is not necessary for the rewriting tool 7 to transmit a specific command commanding the microcomputer A to shift from the standby mode to the rewrite mode.

The microcomputer A returns from the standby mode to the normal mode upon receiving the completion notification command from the rewriting tool 7 (S650: YES).

Accordingly, this embodiment can be used in the case where only the control software B of the microcomputer B is rewritten. In this case, after completion of the rewriting of the control software B (data communication B), the rewriting tool 7 transmits the completion notification command without performing steps S260 to S280 shown in FIG. 3 (FIG. 9). As a consequence, the microcomputer A returns from the standby mode to the normal mode, and resets the microcomputer B that has entered the infinite loop state after completion of the rewriting of the control software B to cause the microcomputer B to return to the normal mode.

Figure 3:
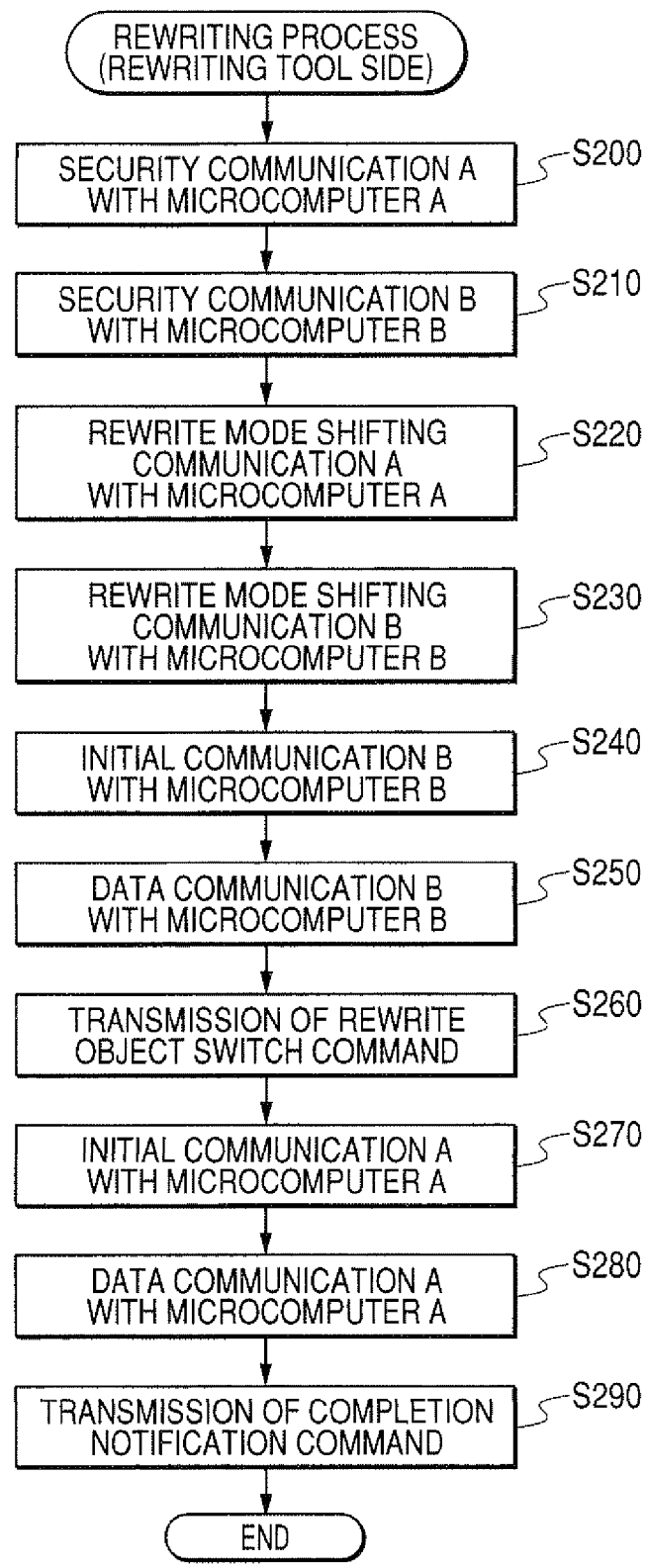
FIG. 3 is a flowchart showing the steps of a rewriting process performed by a rewriting tool.

In the case where only the control software B is rewritten, there may be employed a configuration in which the rewriting tool 7 does not perform step S220 shown in FIG. 3 (FIG. 9), nor transmit the mode switch command A to the microcomputer A. In this case, the microcomputer B is configured to communicate with the microcomputer A through the internal communication line 10 at the time when the microcomputer B has received the mode switch command B from the rewriting tool 7, in order to cause the microcomputer A to shift to the standby mode to perform the rewrite-mode-shift wait process.

In this embodiment, the microcomputer A returns from the standby mode to the normal mode also if the ignition switch is turned off from on (S660: YES).

Accordingly, in the case where only the control software B is rewritten, the microcomputers A, B can be returned to the normal mode even if the rewriting toot 7 does not transmit the completion notification command to the microcomputer A. Furthermore, if the microcomputer A has erroneously shifted to the standby state for some reason, the microcomputer A can be forcibly returned to the normal mode by turning off the ignition switch.

This embodiment is configured such that the microcomputer A returns from the standby mode to the normal mode if the write permission signal from the OR circuit 31 is not at the active level (S640: NO).

Accordingly, if the microcomputer A has erroneously shifted to the standby state for some reason, the microcomputer A can automatically return to the normal mode in such a case. This configuration is made possible by the fact that if the microcomputer A has shifted to the standby state through the normal processes, the write permission signal is expected to be at the active level by the process of step S570 at the microcomputer A side shown in FIG. 6, or by the process of step S370 at the microcomputer B side shown in FIG. 4, and accordingly, it can be determined that the microcomputer A has erroneously shifted to the standby state if the write permission signal is not the active level at the time.

It is a matter of course that various modifications can be made to the above described embodiment as set forth below.

In this embodiment, the objects to be rewritten are limited to the control software A, B stored in the flash memories 13, 23. However, this embodiment may be so configured that all the contents of the flash memories 13, 23, that is, 1 the entire application software A and the entire application software B are rewritten. In this case, the parts of the contents of the flash memories 13, 23 other than the parts corresponding to the control software A, B are rewritten to the same contents as before.

At step S660 shown in FIG. 7, instead of turn-off of the ignition switch, turn-off of a different switch, for example, an engine starter switch, may be detected.

Like the microcomputer A, the microcomputer B may be configured to operate on the power supply voltage Va always supplied from the power supply device. The ECU 1 may include three or more microcomputers.

The above explained preferred embodiments are exemplary of the invention of the present application which is described solely by the claims appended below. It should be understood that modifications of the preferred embodiments may be made as would occur to one of skill in the art.

What is claimed is:

1. An electronic control apparatus comprising:
a first microcomputer having a first electrically rewritable non-volatile memory storing first control software; and
a second microcomputer having a second electrically rewritable non-volatile memory storing second control software;
of said first and second microcomputers, at least said first microcomputer being always powered by an external power supply device,
said first microcomputer controlling a control object by executing said first control software in a normal mode, said second microcomputer controlling a control object by executing said second control software in said normal mode,
said first microcomputer being configured to shift to a rewrite mode upon receiving a mode switch command from an external device to execute a first rewrite processing software in order to rewrite said first control software to third control software transmitted from said external device,
said second microcomputer being configured to shift to said rewrite mode upon receiving said mode switch command from said external device to execute a second rewrite processing software in order to rewrite said second control software to fourth control software transmitted from said external device,
said electronic control apparatus being configured such that said second control software is rewritten first before said first control software is rewritten when said mode switch command is transmitted to both said first and second microcomputers from said external device,
said first rewrite processing software including a program causing said first microcomputer to implement a time-out function which makes a determination whether or not information necessary to rewrite said first control software has been transmitted from said external device within a predetermined time from a time of shift of said first microcomputer to said rewrite mode, and causes said first microcomputer to return from said rewrite mode to said normal mode to execute said first control software if result of said decision is negative, wherein, said first microcomputer is configured not to directly shift to said rewrite mode, but shifts to a standby state to wait for shift to said rewrite mode without executing said first control software when said first microcomputer has received said mode switch command, and configured to shift from said standby state to said rewrite mode upon receiving a mode shift permission command from said external device.

2. The electronic control apparatus according to claim 1, wherein said first control software includes a program causing said first microcomputer to implement a monitoring function which makes a determination whether or not said second control software is being executed normally by said second microcomputer, and resets said second microcomputer if result of said determination is negative.

3. The electronic control apparatus according to claim 2, wherein said first microcomputer is configured to return to said normal mode after completion of execution of said first rewrite processing software, and said second microcomputer is configured to enter an infinite loop state in which said second control software is not executed after completion of execution of said second rewrite processing software, and to return from said infinite loop state to said normal mode by said monitoring function implemented by said first microcomputer.

4. The electronic control apparatus according to claim 1, wherein said mode shift permission command is a command indicating that an object to undergo software rewriting is switched from any microcomputer other than said first microcomputer to said first microcomputer.

5. The electronic control apparatus according to claim 1, wherein said first microcomputer is configured to return from said standby sate to said normal mode if said first microcomputer determines that a predetermined return condition has been satisfied.

6. The electronic control apparatus according to claim 5, wherein said first microcomputer determines that said predetermined return condition has been satisfied, if said first microcomputer receives a completion notification signal from said external device, said completion notification signal indicating that rewritings of said first control software and said second control software have been completed.

7. The electronic control apparatus according to claim 5, wherein said first microcomputer determines that said predetermined return condition has been satisfied, if said first microcomputer detects that an external switch has been manipulated.

8. The electronic control apparatus according to claim 1, wherein said first microcomputer monitors a signal expected to be at an active level when said first microcomputer is in said standby state, and returns from said standby state to said normal mode upon detecting said signal to be not at said active level.

* * * * *